US006654490B2

(12) United States Patent
Love

(10) Patent No.: US 6,654,490 B2
(45) Date of Patent: Nov. 25, 2003

(54) METHOD FOR CONDUCTING ANALYSIS OF TWO-DIMENSIONAL IMAGES

(75) Inventor: Patrick B. Love, Bellingham, WA (US)

(73) Assignee: Limbic Systems, Inc., Bellingham, WA (US)

( * ) Notice: Subject to any disclaimer, the term of this patent is extended or adjusted under 35 U.S.C. 154(b) by 0 days.

(21) Appl. No.: 09/940,272

(22) Filed: Aug. 27, 2001

(65) Prior Publication Data

US 2002/0076098 A1 Jun. 20, 2002

Related U.S. Application Data

(60) Provisional application No. 60/227,934, filed on Aug. 25, 2000.

(51) Int. Cl.$^7$ ................................................. G06K 9/00
(52) U.S. Cl. ....................................... 382/154; 345/419
(58) Field of Search ................................ 382/178, 190, 382/181, 209, 154, 123, 218, 228, 119, 225, 227, 186, 177, 187; 395/126; 345/420, 431, 419, 179, 810, 840, 520, 473; 600/410

(56) References Cited

U.S. PATENT DOCUMENTS

| | | | |
|---|---|---|---|
| 4,024,500 A | | 5/1977 | Herbst et al. |
| 4,561,066 A | * | 12/1985 | Emmons et al. ............ 708/520 |
| 4,709,231 A | * | 11/1987 | Sakaibara et al. .......... 345/426 |
| 4,808,988 A | * | 2/1989 | Burke et al. ................... 345/16 |
| 4,835,712 A | * | 5/1989 | Drebin et al. ............... 345/423 |
| 5,251,265 A | | 10/1993 | Dohle et al. |
| 5,347,589 A | | 9/1994 | Meeks et al. |
| 5,359,671 A | | 10/1994 | Rao |
| 5,369,737 A | * | 11/1994 | Gholizadeh et al. ........ 345/426 |
| 5,633,728 A | | 5/1997 | Tachihara et al. |
| 5,666,443 A | | 9/1997 | Kumashiro |
| 5,730,602 A | | 3/1998 | Gierhart et al. |
| 5,740,273 A | | 4/1998 | Parthasarathy et al. |
| 5,774,582 A | | 6/1998 | Gat et al. |
| 5,949,428 A | * | 9/1999 | Toelle et al. ................. 345/589 |
| 6,185,444 B1 | * | 2/2001 | Ackerman et al. .......... 600/410 |

OTHER PUBLICATIONS

Richard A. Dusak; "The Forensic Information System for Handwriting (FISH)"; presentation material for American Academy of Forensic Sciences annual meeting Feb. 15–20, 1993; 17 pages.

Communication Intelligence Corporation; "Sign–it" (formerly "Pen–Op"); sales literature; Copyright dates 2000, 2001,; 6 pages.

Pikaso Software Inc.; "Write–On—Handwriting Comparison Software"; sales literature; undated; 2 pages.

Sheila Lowe & Associates; "The Write Choice—Handwriting Analysis Software for Windows"; web site literature printed Oct. 28, 2001 and Oct. 25, 2001; 23 pages.

Image Metrology Aps; "Scanning Probe Image Processor (SPIP) for Windows"; sales literature; Oct. 17, 2001; 4 pages.

National Instruments; "LabVIEW"; brochure and seminar information; copyright dates 1999 and 2000; 4 pages.

Sensor Products Inc.; "TOPAQ The Tactile Force Analysis System"; sales literature; copyright date 2000; 6 pages.

Image Content Technology LLC; "Lucis DHP Algorithm" Technical Overview; Copyright date 1999; 39 pages.

MediaCybernetics; "Image Pro PLUS The Proven Solution"; web site literature; printed Oct. 18, 2001; 8 pages.

Kitware: "Visualization Toolkit"; web site literature; printed Oct. 23, 2001, 2 pages.

* cited by examiner

Primary Examiner—Jayanti K. Patel
Assistant Examiner—Seyed Azarian
(74) Attorney, Agent, or Firm—Michael R. Schacht

(57) ABSTRACT

A method of enhancing a source image for analysis. The method comprises the steps of digitizing the source image to obtain pixel data comprising location data and density data, generating a three-dimensional model of the pixel data with the location data represented in first and second axes and the density data represented in a third axis, and analyzing the three-dimensional model to determine features of the source image.

14 Claims, 14 Drawing Sheets

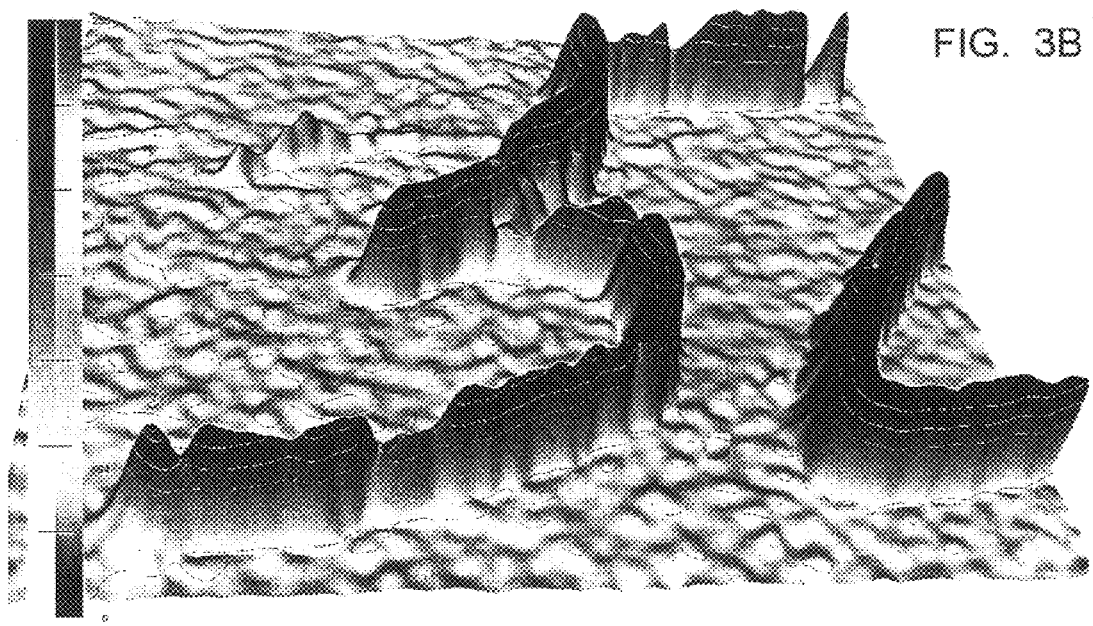

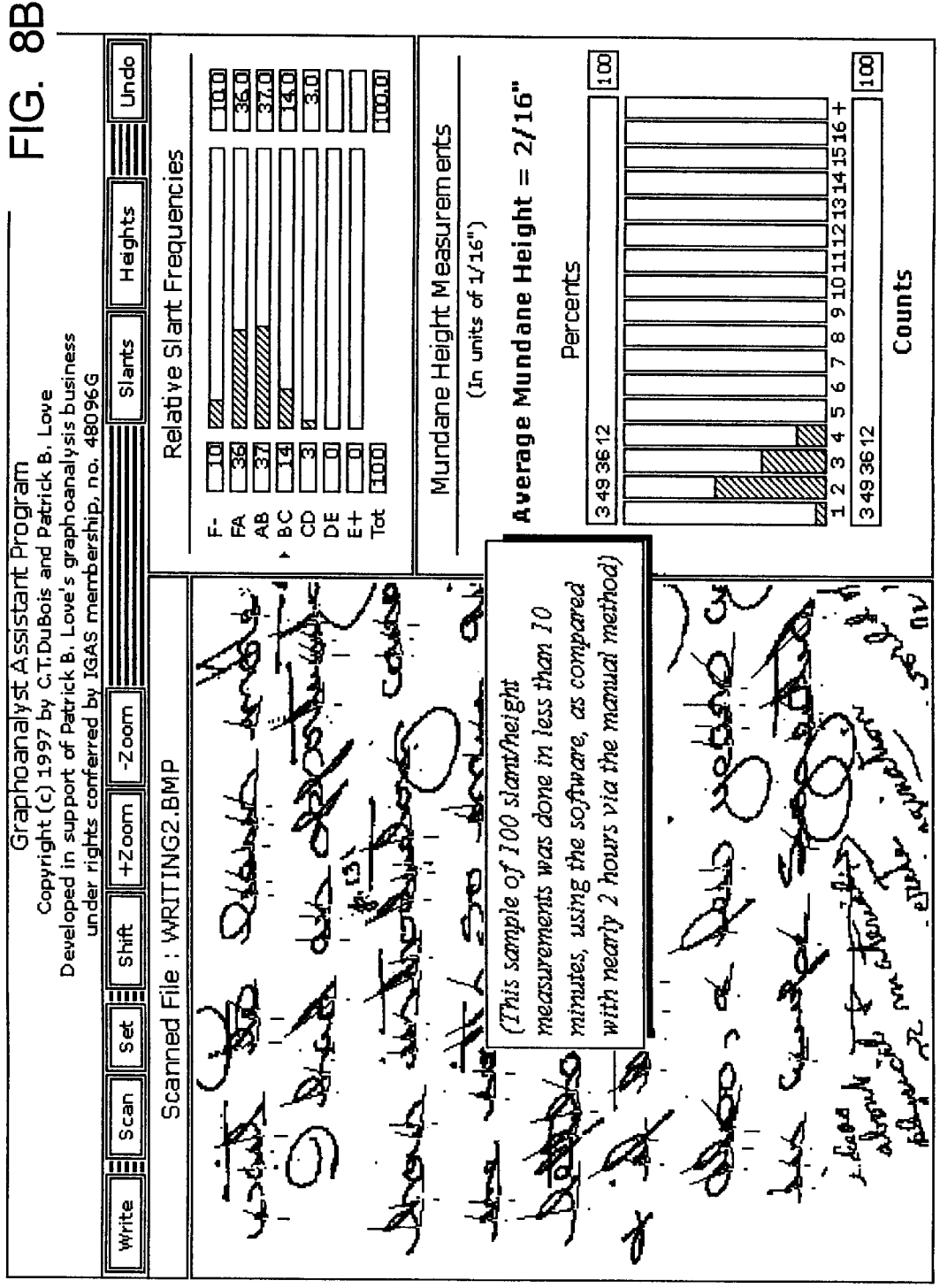

FIG. 9A

Comprehensive Graphoanalytical Trait Inventory

EMOTIONS

*Slant*
- F−
- Extreme withdrawal
- FA
- Withdrawal
- AB
- Objectiveness
- BC
- Mildly responsive
- CD
- Moderately responsive
- DE
- Highly responsive
- E+
- Extremely responsive

*Depth*
- Light
- Moderate
- Moderate-heavy
- Heavy

*Controls*
- Caution
- Conservatism
- Decisiveness
- Dignity
- Poise
- Pride

MENTAL PROCESSES
- Analytical
- Comprehensive
- Cumulative (logical)
- Exploratory
- Investigative

*Intensifying Influences*
- Broad-mindedness
- Concentration
- Conservatism
- Decisiveness
- Details, attention to
- Directness
- Fluidity
- Generosity
- Independent thinking
- Intuitiveness
- Loyalty
- Optimism
- Organizational ability
- Perfectionism
- Positiveness
- Responsibility, desire for
- Rhythm
- Tenacity

FORCES TO ACHIEVE

*Goals*
- Visionary
- Distant
- High-practical
- Low-practical
- Low

*Will Power*
- Weak
- Moderate
- Strong

*Determination*
- Weak
- Moderate
- Strong

*Intensifying Influences*
- Acquisitiveness
- Aggressiveness
- Decisiveness
- Details, attention to
- Directness
- Dominating
- Enthusiasm
- Generosity
- Imagination
- Initiative
- Optimism
- Organizational ability

DEFENSES

*Adjustment*
- Bluff
- Caution
- Conservatism
- Decisiveness
- Dignity
- Diplomacy
- Fluidity
- Generosity, extreme
- Humor
- Independent thinking
- Intuitiveness
- Loyalty
- Narrow-mindedness
- Objectiveness
- Perfectionism
- Persistence
- Philosophical imagination
- Positiveness
- Pride
- Reticence
- Selectivity
- Self-control
- Tenacity
- Yieldingness

Comprehensive Graphoanalytical Trait Inventory

INTEGRITY

*Supportive Influences*
— Ambition
— Broad-mindedness
— Caution
— Conservatism
— Determination
— Dignity
— Directness
— Frankness
— Generosity
— Loyalty
— Pride
— Rhythm
— Self-confidence
— Self-control
— Sincerity

*Reductive Influences*
— Deceptiveness
— Evasiveness
— Impulsiveness
— Prejudice
— Pride, lack of

SOCIAL TRAITS

*Positive Influences*
— Dignity
— Diplomacy
— Frankness
— Generosity
— Humor
— Imagination
— Loyalty
— Optimism
— Physical-mindedness
— Poise
— Pride
— Self-confidence
— Self-control
— Self-reliance
— Sensuousness
— Sympathy
— Talkativeness

*Negative Influences*
— Clannishness
— Deceptiveness
— Domineering nature

APTITUDES (Major supportive traits and characteristics are shown under aptitudes. These lists are not inclusive.)

BUSINESS
— Decisiveness
— Determination
— Diplomacy
— Fluidity
— Imagination
— Initiative
— Organizational ability
— Self-confidence

CULTURAL
— Color appreciation
— Creativity
— Directness
— Fluidity
— Imagination
— Intuitiveness
— Line appreciation
— Literary leanings
  (Greek $e$'s, delta $d$'s)

Comprehensive Graphoanalytical Trait Inventory (These are the major control traits. Many other traits can exert controlling influences in individual personalities.)

FEARS
— Attention, desire for
— Indecisiveness
— Jealousy
— Repression
— Self-castigation
— Self-consciousness
— Self-underestimation
— Sensitiveness
— Stinginess
— Timidity
— Ultra-conservatism
— Withdrawal (FA slant; back-to-self strokes)

*Reductive Influences*
— Confusion of interests
— Detail, inattention to
— Impulsiveness
— Indecisiveness
— Narrow-mindedness
— Pessimism
— Prejudice
— Repression
— Self-deceit
— Superficial thinking
— Yieldingness

IMAGINATION

*Abstract*
— Restricted
— Moderate
— Broad
— Exaggerated
— Latent

*Concrete and Material*
— Restricted
— Moderate
— Active
— Exaggerated
— Latent

— Persistence
— Positiveness
— Precision
— Pride
— Responsibility, desire for
— Self-confidence
— Self-esteem
— Self-reliance
— Self-control
— Tenacity

*Reductive Influences*
— Caution
— Confusion of interests
— Deliberateness
— Detail, inattention to
— Imagination, latent
— Indecisiveness
— Perfectionism
— Pessimism
— Procrastination
— Self-underestimation
— Shallowness
— Yieldingness

*Resistance*
— Aggressiveness
— Argumentativeness
— Defiance
— Domineering nature
— Irritability
— Resentment
— Sarcasm
— Stubbornness
— Temper

*Escape*
— Clannishness
— Concentration
— Daydreaming
— Deceptiveness
— Evasiveness
— Procrastination
— Rejection
— Secretiveness
— Self-deceit
— Shallowness
— Superficial thinking
— Vanity
— Variety, desire for

FIG. 9D

Comprehensive Graphoanalytical Trait Inventory

| | |
|---|---|
| ___ Procrastination | ___ Exaggeration |
| ___ Secretiveness | ___ Extravagance |
| ___ Self-deceit | ___ Idiosyncrasy |
| ___ Selfishness | ___ Impatience |
| ___ Sensuality | ___ Ostentation |
| ___ Shallowness | ___ Selectivity |
| ___ Stinginess | ___ Selfishness |
| ___ Vanity | ___ Sensuality |
| ___ Will power, weak | ___ Shallowness |
| ___ Yieldingness | (See Fears and Defenses for other social traits) |

| | |
|---|---|
| | ___ Manual dexterity |
| | ___ Rhythm |
| | ___ Showmanship |
| | MECHANICAL |
| | ___ Details, attention to |
| | ___ Manual dexterity |
| | ___ Precision |
| | ___ Rhythm |
| | (In general, associate cumulative thinking with manual dexterity and analytical thinking with problem-solving ability.) |

Table of Slant Frequencies (from page 4)

F−: ___
FA: ___
AB: ___
BC: ___
CD: ___
DE: ___
E+: ___

Perspectrograph color key: area P−, white or uncolored; FA, blue; AB, green; BC, yellow; CD, orange; DE, red; E+, purple.

SCIENTIFIC
___ Abstract understanding
___ Analytical
___ Creativity
___ Cumulative
___ Details, attention to
___ Exploratory
___ Investigative
___ Imagination, abstract
___ Imagination, material
___ Manual dexterity
___ Organizational ability
___ Precision

Client's Perspectrograph

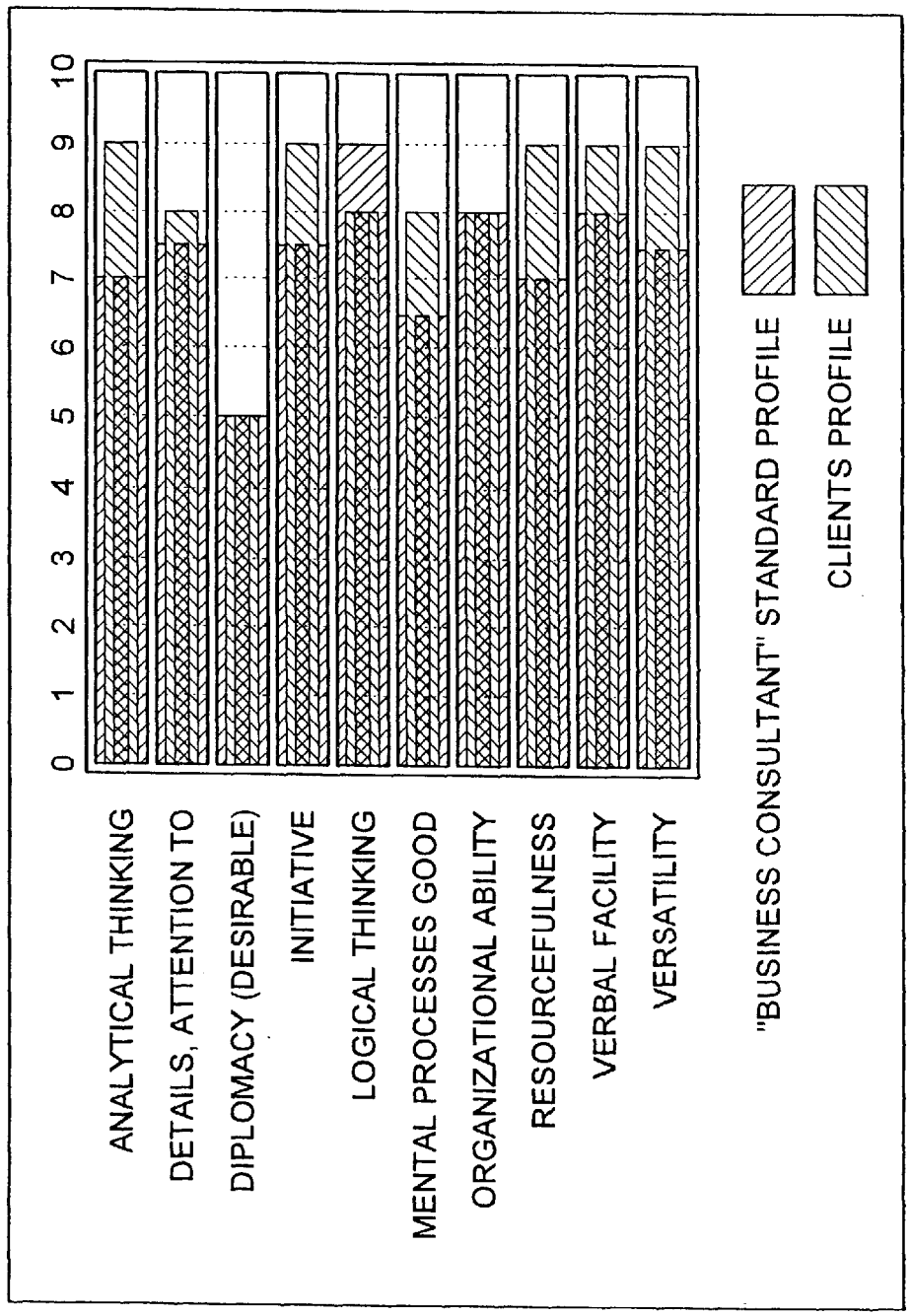

METHOD FOR CONDUCTING ANALYSIS OF TWO-DIMENSIONAL IMAGES

RELATED APPLICATIONS

This application claims priority of U.S. Provisional Application Ser. No. 60/227,934 which was filed on Aug. 25, 2000.

FIELD OF THE INVENTION

The present invention relates generally to methods for the analysis of two-dimensional images, such as a handwriting sample, and, more particularly to a method for analyzing two-dimensional images by using the color density of the image to calculate a third axis which is used to generate a virtual three-dimensional image for viewing and analysis.

BACKGROUND ART

There are numerous circumstances in which it is desirable to analyze a two-dimensional image in detail. For example, it is frequently necessary to analyze and compare handwriting samples to determine the authenticity of a signature or the like. Similarly, fingerprints, DNA patterns ("smears") and ballistics patterns also require careful analysis and comparison in order to match them to an individual, a weapon, and so on. Furthermore, outside the field of criminology, many industrial and manufacturing processes and tests involve analysis of two-dimensional images, such analysis of the contact patterns generated by pressure between the mating surfaces of an assembly, for example. These are just a few examples of a vast array of two-dimensional images that may require analysis and comparison, and although the following discussion will focus mainly on the analysis of handwriting for the purpose of illustrating a preferred embodiment of the present invention, it will be understood that the scope of the present invention includes analysis of all two-dimensional images that are susceptible to the methods described herein.

Conventional techniques for analyzing two-dimensional images are generally labor-intensive, subjective, and highly dependent on the person's experience and attention to detail. Not only do these factors increase the expense of the process, but they tend to introduce inaccuracies that reduce the value of the results. One area that particularly illustrates these problems is the analysis of handwriting. Sometimes referred to as graphoanalysis or questioned document examination (QDE), handwriting analysis is most commonly conducted for the purpose of determining the authenticity of a document or signature. In some instances, however, handwriting analysis may be conducted for different or additional reasons, such as for evaluating a person's writing relative to predetermined criteria to determine aspects of the writer's personality or emotional characteristics; for example, analysis of a person's handwriting is frequently performed for the purpose for evaluating the person's personality and emotional responsiveness, e.g., to determine suitability for employment for positions requiring particular skills or traits, or for assignment to work with certain groups of people or to perform certain tasks. Both types of analysis involve obtaining extensive, painstaking measurements from one or more handwriting samples. In the first category, that of determining whether or not a particular person wrote a certain document, minute details of the person's writing must be measured and catalogued, much in the manner of fingerprint analysis. In the second type of work, that of determining an individual's personality or emotional characteristics, manifold measurements of various features of the writing are taken and then analyzed statistically for comparison with predetermined standards, which for the most part have been derived on an empirical basis from handwriting produced from persons having known personalities or emotional characteristics.

While handwriting analysis is thus a valued tool in many fields, its use has become increasingly hampered by the fact that the measurements have, in the prior art, been obtained almost invariably by manual means, using a magnifying glass, or protractor, pencil and other unsophisticated tools. A great deal of valuable time must thus be spent to analyze even a single person's handwriting, which has rendered this tool uneconomical for use in all but the most important cases. Moreover, since the manual measurement techniques require drawing various lines and marks on the writing sample using a pencil or other writing instrument, this necessarily defaces/damages the original to some extent, which renders obtaining subsequent measurements more difficult and otherwise decreases the usefulness of original document. Perhaps an even more serious problem is the degree of variability and inaccuracy, which is inherent in manual techniques. Human judgment and therefore human error is inevitably present in such techniques, and consequently accuracy is heavily dependent on the manual dexterity and skills of the individual analyst. Furthermore, since each analysis often requires making hundreds of measurements, fatigue often becomes a very real factor and can impair the efforts of even the most skilled practitioner. Still further, determining the baselines and other starting points for the various measurements is a highly objective process in itself, and results in a high degree of variability between the measurements taken by different analysts.

Moreover, even when performed by the most skilled analysts, there are certain determinations that are virtually impossible to make with an acceptable degree of accuracy when using conventional techniques. For example, a recurring question is whether a signature was applied to a document before or after it was printed. This is done by trying to ascertain whether the writing passes over the printing, or vice versa. Previously, there has existed no reliable way for making this determination, and it is very common for analysts to come to completely different conclusions when examining the same document.

As a result, although the general value of handwriting analysis is well established, the inefficiencies and inaccuracies that are inherent in the manual measurement techniques have limited its widespread application. For example, graphoanalysis is potentially an extremely valuable tool for human resources departments and governmental agencies, but the problems with cost and accuracy have thus far limited its adoption in these areas. Similarly, the difficulty in obtaining economical and accurate analysis of handwriting specimens has surrendered this resource unavailable to many criminal and civil investigators, especially for police departments which are located more rural areas, where the availability of skilled handwriting analysts tends to be limited and budgets tend to be tight.

As was stated above, handwriting analysis is just one example of the many areas where improved methods for analysis of two-dimensional images are needed. Many of the factors and issues discussed above apply with equal force to the analysis of two-dimensional images of different types and for different purposes. Many of these purposes lie within the field of criminology (DNA matching, ballistics analysis, etc.), but as was noted above, many other instances occur in other industries and fields.

Accordingly, there exists a need for a method for analysis of two-dimensional images which does not require measurements to be performed manually, and which therefore minimizes or eliminates the element of inaccuracy and variability inherent in manual measurements. Furthermore, there exists a need for such a method which enables large numbers of measurements to be obtained, compiled and analyzed quickly and economically.

Still further, there exists a need for such a method which enables such measurements to be taken in a uniform manner, so if these can be compared with other samples or to predetermine standards in order to precisely determine internal consistencies. Still further, there exists a need for such a method which will enable analysts to examine features of two-dimensional images which have previously not been visible or apparent. Still further, there exists a need for such a method which is easy and convenient to use, and which minimizes the physical and visual stress involved in conducting the analysis. Still further, there exists a need for such a method which will permit measurements to be taken and used by a trained analyst who is not necessarily located in the vicinity of the source image itself, so as to make this resource more readily available to users in geographically remote areas.

SUMMARY OF THE INVENTION

The present invention provides a method for detailed and accurate analysis of two-dimensional images. Broadly, this comprises the steps of measuring the variations in color/gray scale density in the two-dimensional image, calculating a set of values based on the variations in densities, and applying the calculated values to a third, Z-axis in combination with the x- and Y-axes of the two-dimensional image so as to produce a virtual three-dimensional representation of the original image. The step of measuring the variations in color/gray-scale density may comprise the step of scanning the two-dimensional source image so as to obtain a bit map of the image. The step of producing a virtual three-dimensional representation may comprise the step of assigning positive values to the color/gray scale densities so that the three-dimensional representation appears as an image of a raised "mountain range." Alternatively, negative values may be assigned so that the three-dimensional representation appears as a sunken channel or "canyon".

The present invention also provides a method for producing, measuring and analyzing a two-dimensional representation of the sourced image.

These and other features and advantages of the present invention will be apparent from a reading of the following detailed description with reference to the accompanying drawings.

BRIEF DESCRIPTION OF THE DRAWINGS

FIGS. 3A and 3B are virtual three-dimensional representations of a two-dimensional image, in this case a sample of handwriting, with areas of higher apparent elevation in the three-dimensional image corresponding to areas of increased gray scale density in the two-dimensional image;

FIGS. 8A and 8B are reproductions of samples of handwriting as displayed on a computer monitor in accordance with another aspect of the present invention, showing exemplary cursor markings on which measurements are based, and also showing a summary of the relative slant frequencies which are categorized by sections of the slant gauge of FIG. 7;

FIGS. 9A–9D is a portion of a comprehensive trait inventory produced for the writing specimen for FIG. 8 in accordance with the present invention; and FIG. 10 is a trait profile comparison produced in accordance with the present invention by summarizing trait inventories in FIG. 9.

DETAILED DESCRIPTION a. Overview

As was noted above, the present invention provides a method for analysis of two-dimensional images. The purposes of illustration, the invention will be described below primarily in the context of the analysis of handwriting, although it will be understood that the two-dimensional images may be of any suitable type. The original two-dimensional image will referred to as the source image herein.

A principal aspect of the present invention is to provide a virtual three-dimensional model or representation of the two-dimensional source image by measuring the differences in color/gray scale density that exist in the two-dimensional source image and then using these differences to generate the third axis of the three-dimensional model or representation. The three-dimensional model or representation will also be referred to herein as a virtual three-dimensional image.

The three-dimensional model or representation, or virtual three-dimensional image, is then analyzed to evaluate aspects and features of the original two-dimensional source image. The three-dimensional model or representation may be analyzed based on a two-dimensional analysis image created from the three-dimensional model that allows for precise measurement and evaluation of various aspects and features of the original two-dimensional source image. Alternatively, the three-dimensional model or representation may be analyzed by performing a mathematical and/or statistical analysis of the three-dimensional model or representation. In addition, the present invention may be implemented by both analyzing a two-dimensional analysis image based on the three-dimensional model and by performing mathematical and/or statistical analysis of the three-dimensional model.

In a general sense, "color density" or "gray scale density" refers to the darkness of the source image at any particular point. For example, in a typical handwriting stroke formed on white paper, the source image will be lighter (i.e., have a lower color/gray scale density) along its edge, will grow darker (i.e., have a greater color/gray scale density) towards its middle, and will then taper off and become lighter towards its opposite edge. In other words, measured in a direction across the line, the color/gray scale density is initially low, then increases, and then decreases again.

Figure 2:
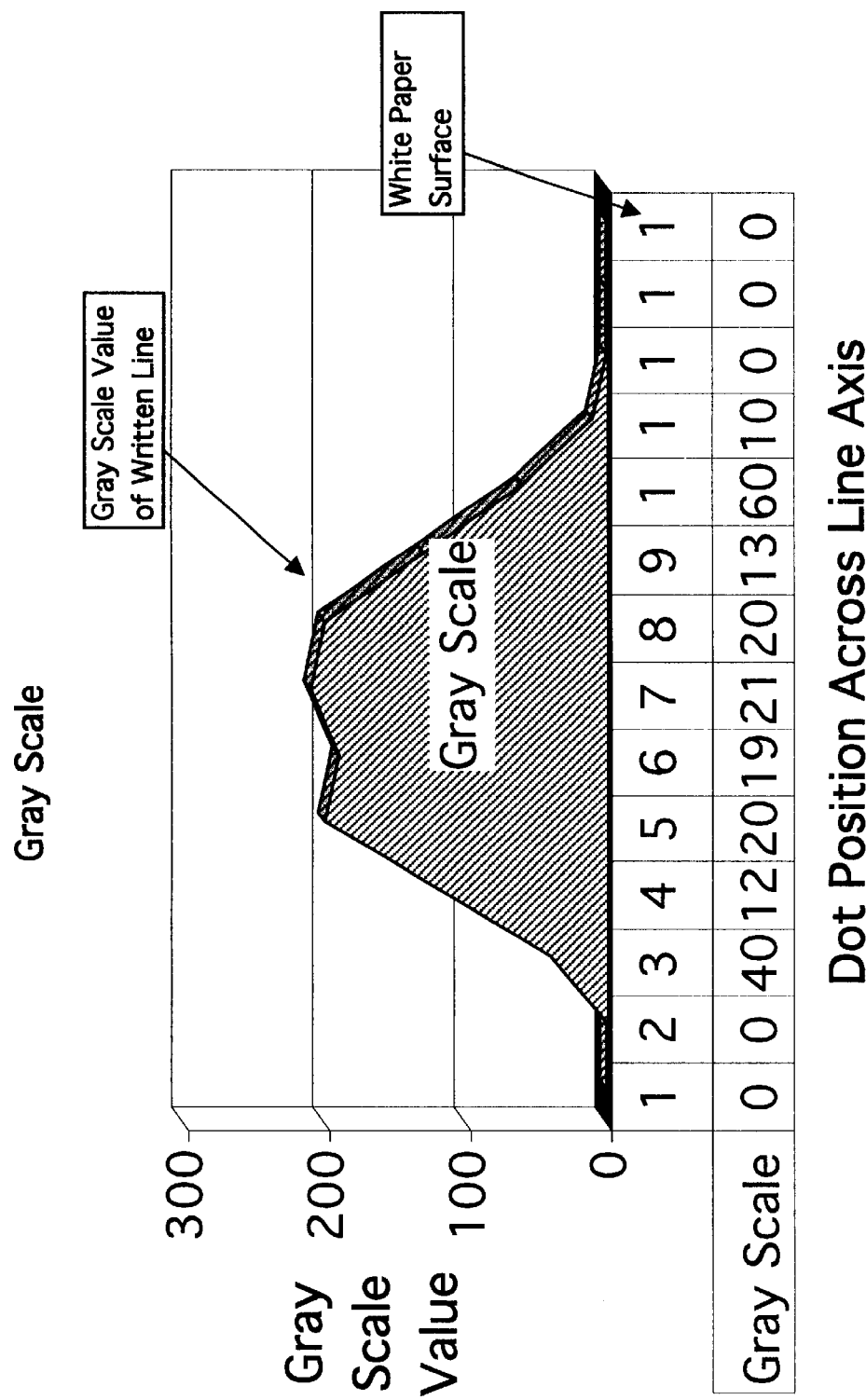
FIG. 2 is a graphical plot in which the vertical axis shows color density/gray scale values that increase and decrease with increasing and decreasing darkness of the two-dimensional image, as measured in a line drawn across the axis of the image.

As is shown in FIG. 2, the increasing and decreasing color/gray scale density can be plotted on a vertical axis relative to dot locations along and across the two-dimensional source image, i.e., along the x- and y-axes. The color/gray scale density can thus be used to calculate a third axis (a "Z-axis") in the vertical direction, which when combined with the x- and y-axes of the two-dimensional source image forms a virtual three-dimensional image, model, or representation that can be displayed on a computer monitor or other viewing device.

Figure 3A:
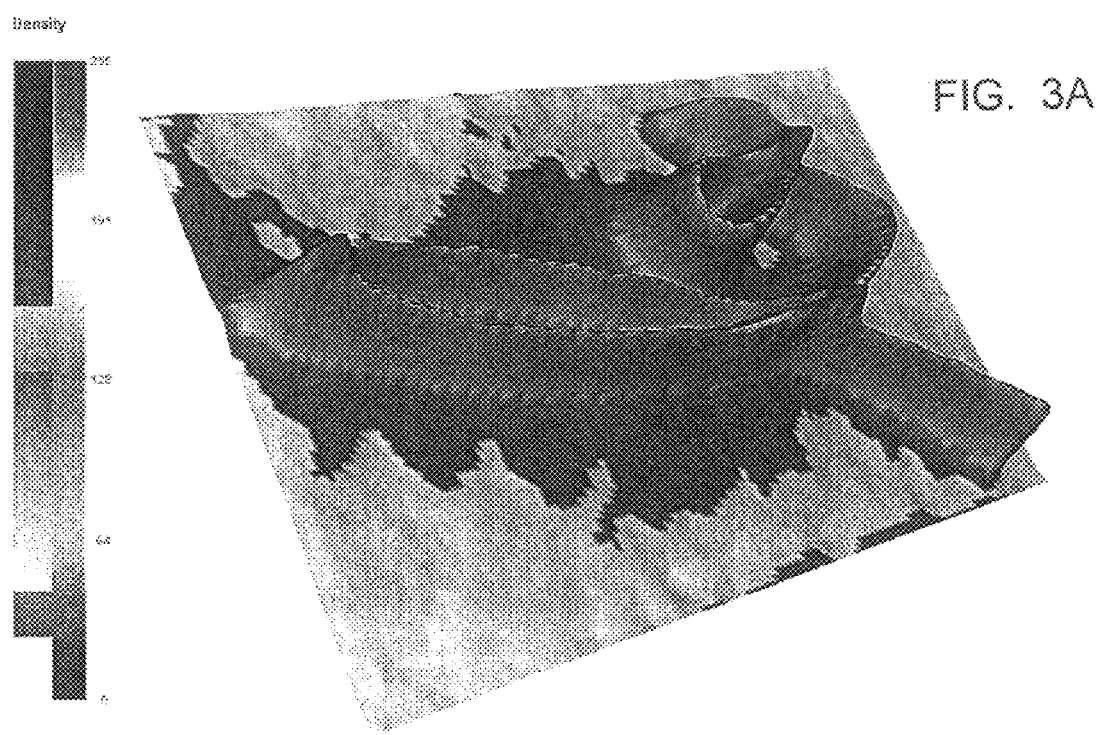
Figure 4A:
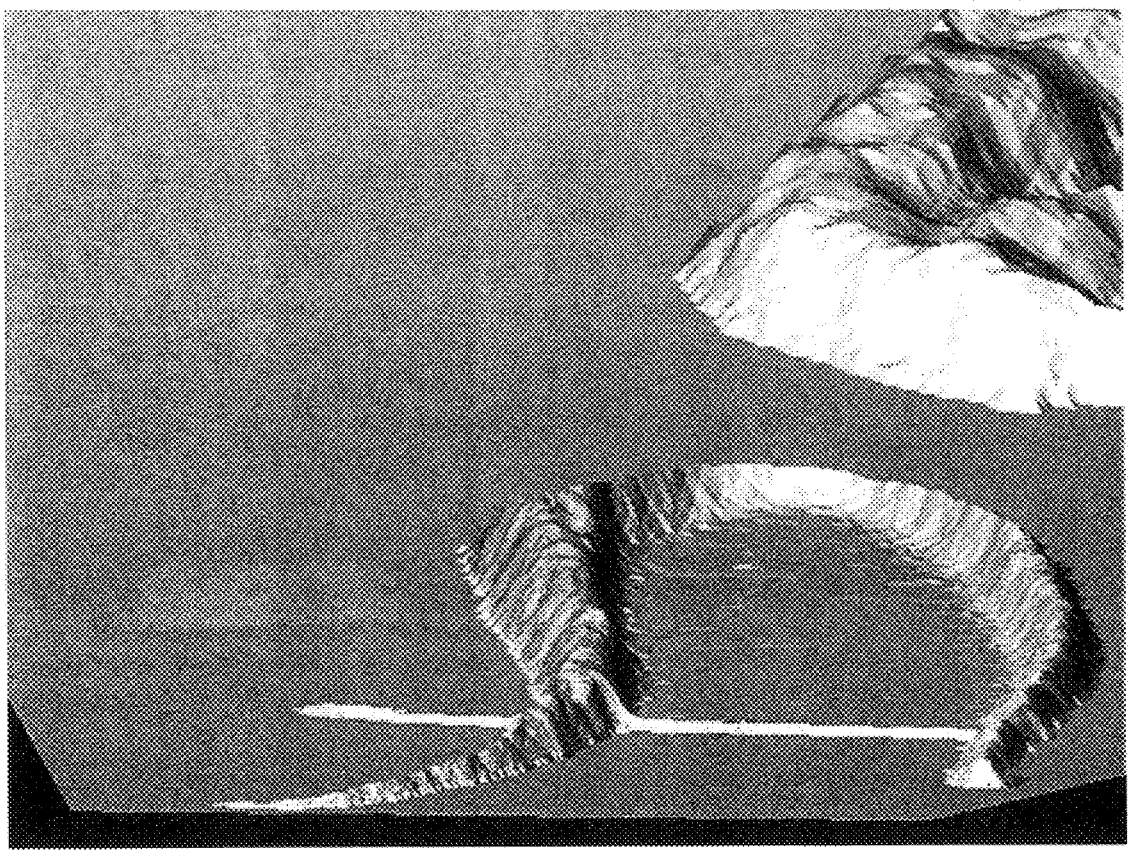
FIGS. 4A and 4B are also virtual three-dimensional representations of a two-dimensional image in accordance with the present invention, with the two-dimensional image again being a sample of handwriting, but in this case with the value of the gray scale density being inverted so as to be represented by the depth of a "channel" or "valley" rather than by the height of a raised "mountain range" as in FIG. 3.
Figure 4B:
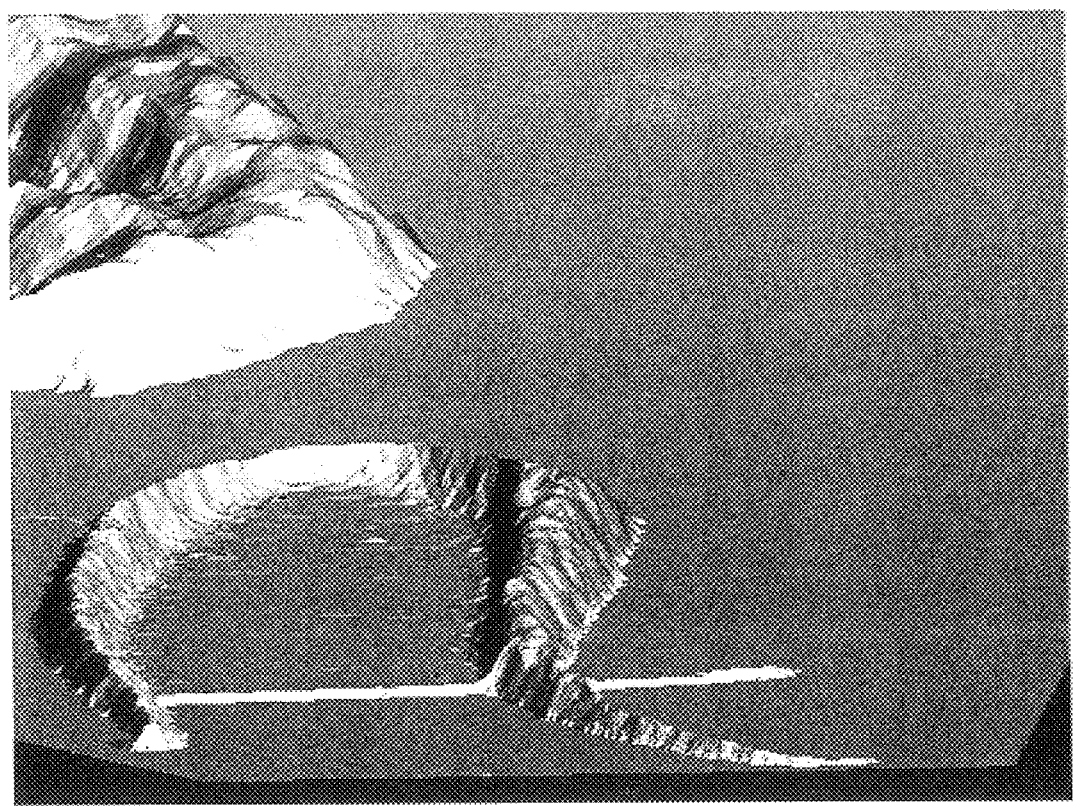

In the context of the present invention, the terms "three-dimensional image" or "two-dimensional analysis image" refer to a two-dimensional plot of data obtained from the three-dimensional model or representation generated as described above. The two-dimensional plot of data derived from the three-dimensional model or representation will often contain artistic "perspective" that will appear three-dimensional. For example, as is shown in FIG. 3, the density measurements can be given positive values so that the Z-axis extends upwardly from the plane defined by the X- and y-axes. When this data is plotted in two-dimensions, a three-dimensional image (or two-dimensional analysis image) is produced that resembles a raised "mountain range"; alternatively, the Z-axis may be in the negative direction, so that the three-dimensional image appears as a channel or "canyon" as shown in FIG. 4.

Furthermore, as indicated by the scale on the left side of FIG. 3, the three-dimensional image may include different shades of gray or different colors to aid the operator in visualizing and analyzing the "highs" and "lows" of the image, somewhat analogous to the manner in which elevations are indicated by designated colors on a map. In addition, a "shadow" function may be included to further heighten the three-dimensional effect.

The three-dimensional image (or two-dimensional analysis image) of the virtual three-dimensional model or representation makes it possible for the operator to see and evaluate many more features of the two-dimensional source image than was previously possible.

Figure 5:
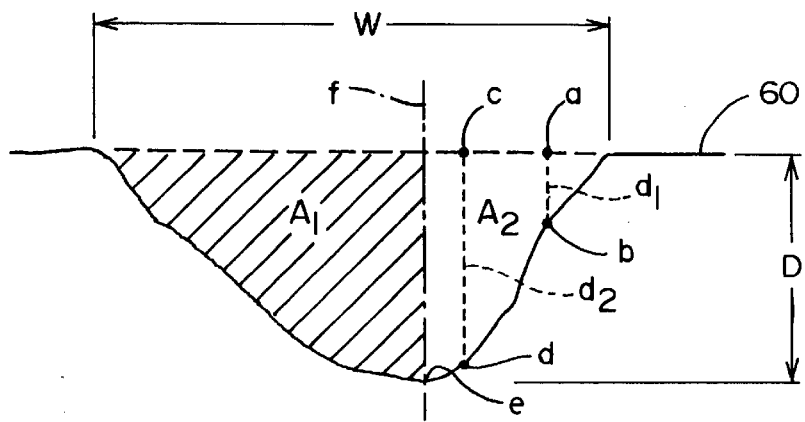
FIG. 5 is a view of a cross-section taken through the virtual 3-D image in FIG. 4, showing the contour of the "valley" which represents increasing and decreasing gray scale darkness/density which is measured across a stroke of the writing sample, and showing the manner in which the two sides of the image are weighted relative to one another to ascertain the angle in which the writing instrument engaged the paper as the stroke was formed.

For example, the way in which the maximum "height" or "depth" of the image is shifted or "skewed" towards one side or the other can indicate the direction in which the pen or other writing tool was held/tilted as the stroke was made. As can be seen in FIG. 5, this can be accomplished by determining the lowermost point or bottom "e" of the valley, and then calculating the areas A1 and A2 on either side of a dividing line "f" which extends upwardly from the bottom of the valley, perpendicular to the plane of the paper surface: that side having the greater area (e.g., A1 in FIG. 5) represents that side of the stroke on which the pressure of the pen/pencil point was greater, and therefore indicates which hand the writer was using to form the stroke or other part of the writing. As a further step, the areas A1, A2 can be compiled and integrated over a continuous section of the writing. Furthermore, the line "f" can be considered as forming a divider plane or "wall" which separates the two sides of the valley, and the relative weights of the two sides can then be determined by calculating their respective volumes, in a manner somewhat analogous to filling the area on either side of "wall" with water. For the convenience of the user, the "water" can be represented graphically during this step by using a contrasting color ( e.g., blue) to alternately fill each side of the "valley" in the 3-D display.

Still further, by examining the "wings" and other features which develop where lines cross in the image, the operator can determine which one line was written atop the other or vice versa. This may allow a person analyzing handwriting to determine whether a signature was applied before or after a document was printed.

Figure 1:
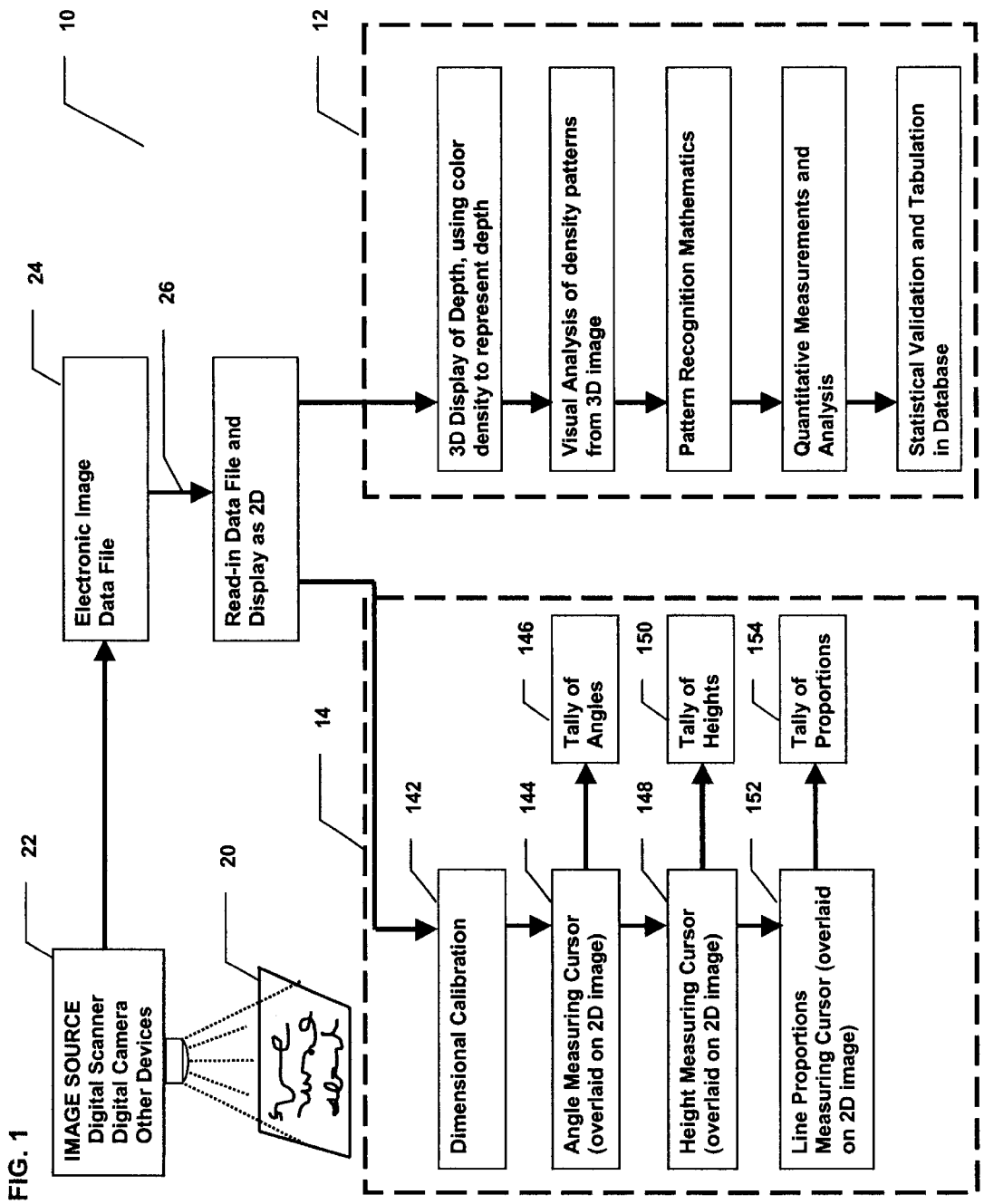
FIG. 1 is a block diagram showing the steps of obtaining a digital scan of the two-dimensional image to be analyzed, and then analyzing the relevant characteristics thereof in accordance with method of the present invention.

Accordingly, FIG. 1 provides a block diagram at 10 that illustrates the sequential steps in obtaining and manipulating the images in accordance with the present invention. As can be seen, the initial steps of scanning the two-dimensional image and reading of the data file are followed by two, separate series of steps, one for creating and analyzing the virtual 3-D image, model, or representation, and the other for creating and measuring/analyzing a two-dimensional analysis image that is derived from the virtual image, model, or representation. It will be understood that it is easily within the ability of a person having an ordinary level of skill in the art of computer programming to develop software for implementing these and the following method steps, using a PC or other suitable computer platform, given the descriptions and drawings which are provided herein.

b. Digitizing Source Image

As can be seen in FIG. 1, the first step in the process is to scan a handwriting sample 20 using a digital camera or scanner 22 to create a digital bit-map file 24. For accuracy, it is preferred that the scanner have a reasonably high level of resolution, e.g., a scanner having a resolution of 1,000 bpi has been found to provide highly satisfactory results. These first two steps can be performed using conventional scanning equipment of this type, such as a flatbed or hand-held digital scanner for example, which are normally supplied by the manufacturer with suitable software for generating the bit-map file. For example, the digital image scanner may produce a bit map image by reporting a digital gray scale value of 0 to 255. The variation in shade or color density from say 100 to 101 on such a gray scale is not detectable by the human eye, making for extremely smooth appearing images whether on-screen or printed.

With, typically, "0" representing complete lack of color or contrast (white) and "255" representing complete absorption of incident light (black), the scanner reports a digital value of gray scale for each dot per inch at the rated scanner resolution. Typical resolution for consumer level scanners is 600 dpi. Laser printer output is nominal 600 dpi and higher, with inexpensive ink jet printers producing near 200 dpi. Nominal 200 dpi is fully sufficient to reproduce the image as viewed on the high-resolution computer monitor. Images are printed as they appear on-screen, type fonts print at higher resolution as a result of using font data files (True-Type, Postscript, etc) instead of the on-screen bitmap image. High-resolution printers may use multiple dots of color (dpi) to reproduce a pixel of on-screen bit map image. Thus, the scanned document produces a "bit map image", with each bit or pixel assigned a gray scale value representing the darkness of the image at that point on the source document.

The software subsequently uses this image on an expanded scale to view each "dot per inch" more clearly. Due to this scanning method, there is no finer detail available than the "single-dot" level. Artifacts as large as a single dot will cause that dot's gray scale value to be significant of that artifact. Artifacts much smaller than a single dot per inch will not be detected by the scanner. This behavior is similar to the resolution/magnification capabilities of an optical microscope. A typical pen stroke, when scanned at 600 dpi, will thus have on the order of 10 or more bits of gray scale data taken across the axis of the line. As is illustrated in FIG. 2, gray scale values may be "0" for the white paper background, increasing abruptly to some value, say 200, perhaps hold near 200 for several "dots" and then decrease abruptly to "0" again as the edge of the line transitions to background white paper value.

The bit-map file is next transmitted via a telephone modem, network, serial cable, or other data transmission link 26 to the analysis platform, e.g., a suitable PC or Macintosh™ computer that has been loaded with software for carrying out the steps described below. The first step in the analysis phase, then, is to read in the digital bit-map file which has been transmitted from the scanner system, as indicated at 28. The bit map is then processed to produce the virtual three-dimensional display, model, or representation and/or the two-dimensional display or analysis image, as will be described in separate sections below.

c. Virtual 3-D Display/Analysis

As was noted above, the gray-scale (i.e., color density/intensity) of the scanned source image is used for the third dimension to create a virtual 3-D image, model, or representation that highlights the density patterns of the original.

To represent three-dimensional space, the method of the present invention uses an x-y-z coordinate system. A set of points represents the image display space in relation to an origin point, 0, 0. In 2-D, a set of axes, x and y, represent horizontal and vertical directions, respectively. Point 0, 0 is the lower-left corner of the image ("southwest" corner), where the x- and y-axes intersect. When viewing in 2-D, or when first opening a view in 3-D (before doing any rotations), the operator will see a single viewing plane (the x-y plane) only.

In 3-D, an additional z-axis is used for points lying above and below the two-dimensional x-y plane. The x-y-z axes intersect at the origin point, 0, 0, 0. As is shown in FIGS. 3 and 4, the third dimension adds the elements of elevation, depth, and rotation angle. Thus, using a digital scanner coupled with a computer to process the data, similar plots of gray scale can be constructed 600 times per inch of line length (or more with higher resolution devices). Juxtaposing the 600 plots per inch produces an on-screen display or analysis image in which the original line appears similar to a virtual "mountain range". If the plotted data is given negative values instead of positive, the mountain range appears to be a virtual "canyon" instead. The representation is displayed as a "mountain range" or "canyon" for visualization convenience; however, it will be understood that the display does not represent a physical gouge, or trench, or mound of ink upon the paper.

The coordinate system is preferably oriented to the screen, instead of "attached" to the 3-D view object. Thus, movement of the image simulates movement of a camera: as the operator rotates an object, it appears as if the operator is "moving the camera" around the image.

In a preferred embodiment, the positive direction of the X-axis goes to the right; the positive direction of the V-axis goes up; and the positive Z-axis goes into the screen, away from the viewer, as shown in FIG. 3. This is called a "left-hand" coordinate system. The "left-hand rule" may therefore be used to determine the positive axis directions: Positive rotations about an axis are in the direction of one's fingers if one grasps the positive part of an axis with the left hand, thumb pointing away from the origin.

Distinctively colored origin markers may also be included along the bottom edge of an image to indicate the origin point (0, 0, 0) and the end point of the X-axis, respectively. These markers can be used to help re-orient the view to the X-y plane—for example, after performing a series of zooms and/or rotations in 3-D space.

Visual and quantitative analysis of the three-dimensional images obtained from a two-dimensional handwriting sample can be carried out as follows, using a system and software in accordance with a preferred embodiment of the present invention.

1. Angle of "Mountain Sides"

Visual examples noted to date show that "steepness" of the mountain slopes is clearly visualized and expresses how sharp the edge of the line appears. Steeper corresponds to Sharper.

Quantitatively, the slope of a line relative to a baseline can be expressed in degrees of angle, rise/run, curve fit to an expression of the type y=mx+b, and in polar coordinates. The expression of slope can be measured along the entire scanned line length to arrive at an average value, standard deviation from the mean, and the true angle within a confidence interval, plus many other possible correlations.

2. Height of the "Mountain Range"

Visual examples show that height is directly related to the color density of the line, that is a dark black line results in a taller "mountain range" (or deeper "canyon") as compared to a hard lead pencil line. Quantitative measurements of the mountain range height can be made at selected points, regions, or the entire length of the line. Statistical evaluation of the mean and standard deviation of the height can be done to mathematically establish the lines are the same or statistically different.

3. Variation in Height of the "Mountain Range"

Variations in "mountain range" height using the same instrument may reveal changes in pressure applied by the writer, stop/start points, mark-overs, and other artifacts.

Changes in height are common in the highly magnified display; quantification will show if changes are statistically significant and not within the expected range of height.

Each identified area of interest can be statistically examined for similarities to other regions of interest, other document samples, and other authors.

4. Width of the "Mountain Range" at the Base and the Peak

Visual examples show variation in width at the base of the "mountain range", allowing comparison with similar regions of text.

Quantification of the width can be done for selected regions or the entire line, with statistical mean and standard deviation values. Combining width with the height measurement taken earlier may reveal unique ratios for individual writing instruments, papers, writing surfaces, pen pressure, and others factors.

5. "Skewness" of the "Mountain Range", Leaning Left or Right

Visual examples have displayed a unique angle for a single author, whether free-writing or tracing, while a second author showed visibly different angle while tracing the first author's writing.

Quantitative measurement of the baseline center and the peak center points can provide an overall angle of skew. A line through the peak perpendicular to the base will divide the range into two sides of unequal contained area, an alternative measure of skew value.

6. "Wings" or Ridges Appearing at Line Intersections

Visual examination has shown "wings" or ridges extending down the "mountainside", following the track of the lighter density crossing line.

Quantitative measure of these "wings" can be done to reveal a density pattern in a high level of detail. The pattern may reveal density pattern effects resulting from the two lines crossing. Statistical measures can be applied to identify significant patterns or changes in density.

7. Sudden Changes in "Mountain Range" Elevation

Visual inspection readily reveals pen lifts, re-trace and other effects as revealed by sudden changes in "mountain range" elevation.

Quantitative measure of height can be used to note when a change is statistically significant, and identify the measure of the change. Similar and dissimilar changes elsewhere in the document can be evaluated and compared.

8. Fill Volume of the "Mountain Range", Better Visualized as a Virtual Canyon Filling with Water Visual effects are noted such as a flat bottom "canyon" created by felt tip marker, "hot spots" of increased color density (deeper pits in the canyon), and other areas of the canyon which change with fill (peninsulas, islands, etc.).

Quantitative calculation of the amount of "water" required to fill the canyon can be done. Relating the amount (in "gallons") to fill one increment ("foot") over the entire depth of the "canyon" will reveal a plot of gallons per foot that will vary with canyon type. For instance, a square vertical wall canyon will require the same gallons per foot from bottom to top. A canyon with even 45° sloped walls will require two times as many gallons to fill each succeeding foot of elevation from bottom to top.

9. Color Density or Gray Scale Isopleths Connecting Similar Values of Gray Scale Along the "Mountain Range" Sides or "Canyon" Walls Visually, this appears similar to a conventional topographic map. This is similar to the water fill described above, however it does not hide features as water level rises. Each isopleth on the topographical map is the same thing as a beach mark left by a lake or pond.

Quantitatively a variety of measures could be taken to provide more information. For instance length of the isopleth, various distances horizontally and vertically measured, and so on.

10. Color Value (RGB, Hue and Saturation) of Individual Dots as Reported by Color Capable Scanners Color can be an extremely valuable addition to the magnified display of the original document.

Quantitatively identifying the color value can provide valuable information, especially in the area of line intersections. In certain instances it may be possible to identify patterns of change in coloration that reveal line sequence. Blending of colors, overprinting or obscuration, ink quality and identity, and other artifacts may be available from this information.

Additional manipulation and/or refinement of the virtual 3-D image can be carried out as follows:

A. Smoothing/Unsmoothing the Image in a 3-D View

A technique known in the art as smoothing can be used to soften or anti-alias the edges and lines within an image. This is useful for eliminating "noise" in the image.

B. Applying Decimation (Mesh Reduction) to an Image

In 3-D image processing, an object or solid is divided into a series or mesh of geometric primitives (triangles, quadrilaterals, or other polygons) that form the underlying structure of the image. By way of illustration, this structure can be seen most clearly when viewing an image in wire frame, zooming in to enlarge the details.

Decimation is the process of decreasing the number of polygons that comprise this mesh. Decimation attempts to simplify the wire frame image. Applying decimation is one way to help speed up and simplify processing and rendering of a particularly large image or one that strains system resources.

For example, one can specify a 90%, 50%, or 25% decimation rate. In the process of decimation, the geometry of the image is retained within a small deviation from the original image shape, and the number of polygons used in the wire frame to draw the image is decreased. The higher the percentage of decimation applied, the larger the polygons are drawn and the fewer shades of gray (in grayscale view) or of color (in color scale view) are used. If the image shape cannot conform to the original image shape within a small deviation, then smaller polygons are retained and the goal of percentage decimation is not achieved. This may occur when a jagged, unsmoothed, image with extreme peaks and valleys is decimated.

The decimated image does not lose or destroy data, but recalculates the image data from adjacent pixels to reduce the number of polygons needed to visualize the magnified image. The original image shape is unchanged within a small deviation limit, but the reduced number of polygons speeds computer processing of the image.

When building 3-D forensic visualizations of evidentiary images, decimation can be used to advantage for initially examining images. Then, when preparing the actual analysis for presentation, the decimation percentage can be set back to undo the visualization effects of the command.

C. Sub-sampling an Image

When the system displays a three-dimensional image, it samples every pixel of the corresponding scan in order to build the 3-D image. Sub-sampling is a digital Image-processing technique of sub-sampling every second, or third, or fourth pixel, (depending on the amount of sub-sampling specified by the user) instead of sampling every pixel to display a 3-D image.

The resulting view results in some simplification of the image. Sub-sampling reduces image data file size to optimize processing and rendering time, especially for a large image or an image that strains system resources. In addition to optimizing processing, the operator can use more extreme sub-sampling as a method for greatly simplifying the view to focus on features at a larger-granular level of the image, as shown in this example.

When sub-sampling an image, fewer polygons are used to draw the image since there are fewer pixels defining the image. The more varied the topology of the image, the more likely that sub-sampling will not adequately render an accurate shape of the image. The lower the sub-sampling percentage, the fewer the number of pixels and the larger the polygons are drawn. Fewer shades of gray (in grayscale view) or of color (in color scale view) are used.

D. Super-sampling an Image

Super-sampling is a digital image-processing technique of interpolating extra image points between pixels in displaying a 3-D image.

The resulting view is a greater refinement of the image. It should be borne in mind that super-sampling generally increases both image file size and processing and rendering time.

When super-sampling an image, more image points and polygons are used to draw it. The higher the super-sampling percentage, the more image points are added and the smaller the polygons are drawn and the more shades of gray (in grayscale view) or of color (in color scale view) are used. The geometry of the super-sampled image is not altered as compared to the pixel-by-pixel sampling at 100%.

E. Horizontal Cross-Section Transformation (3-D)

Horizontal Cross-Section transformation creates a horizontal, cross-sectional slice (parallel to the x-y plane) across an isopleth.

F. Invert Transformation (3-D)

Invert transformation inverts the isopleths in the current view, transforming virtual "mountains" into virtual "canyons" and vice versa.

For instance, when a written specimen is first viewed in 3-D, the written line may appear as a series of canyons, with the writing surface itself at the highest elevation, as in this example. In many cases, it may be easier to analyze the written line as a series of elevations above the writing surface. Invert transformation can be used to adjust the view accordingly, as in this example.

G. Threshold Transformation (3-D)

The Threshold transformation allows the operator to set an upper and lower threshold for the image, filtering out values above and below certain levels of the elevation. The effect is one of filling up the "valley" with water to the lower contour level and "slicing" off the top of the "mountains" at that level. This allows the operator to view part of an isopleth or a section of isopleths more closely without being distracted by isopleths above or below those upper/lower thresholds.

d. Method Steps—2-Dimensional Display/Analysis

As was noted above, the method of the present invention also provides for two-dimensional analysis of certain images, which is of particular value to the analysis of certain handwriting samples.

Two of the principal measurements that can be carried out by the system of the present invention in this context are (a) the slant angles of the stokes in the handwriting, and (b) the relative heights of the major areas of the handwriting. These angles and heights are illustrated in FIG. 6, which shows a handwriting sample 110 having a base line 112 from which the other measurements are taken; in the example shown in FIG. 1, the base line is drawn beneath the entire phrase in Sample 110 for ease of illustration, but it will be understood that in most instances, the base line will be determined separately for each stoke or letter in the sample.

Figure 6:
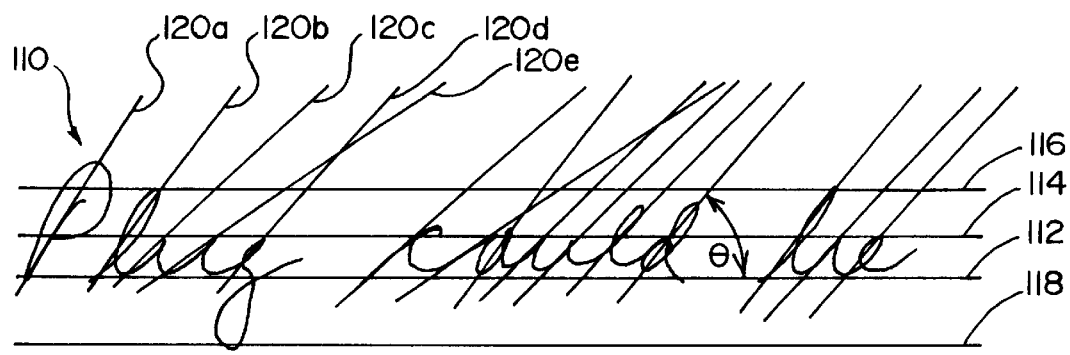
FIG. 6 is a reproduction of a sample of handwriting, marked with lines to show the major elements of the writing and the upstroke slants thereof, as these are employed in accordance with another aspect of the present invention.

A first area above the base line, up to line 114 in FIG. 6 defines what is known as the mundane area, which extends from the base line to the upper limit of the lower case letters; the mundane area is considered to represent the area of thinking, habitual ideas, instincts and creature habits, and also the ability to accept new ideas and the desire to communicate them. The extender letters continue above the mundane area, to an upper line 116 which defines the limit of what is termed the abstract area, which is generally considered to represent that aspect of the writer's personality which deals with philosophies, theories, and spiritual elements.

Finally, the area between base line 112 and the lower limit line 118 defined by the descending letters (e.g., "g", "y", and so on) is termed the material area, which is considered to represent such qualities as determination, material imagination, and the desire for friends, change, and variety.

The base line also serves as the reference for measuring the slant angle of the strokes forming the various letters. As can be seen in FIG. 6, the slant is measured by determining a starting point where a stroke lifts off the base line (see each of the upstrokes) and an ending point where the stroke ceases to rise, and then drawing a line (120a, 120b, 120c, 120d . . . , in FIG. 6) between these points and determining the angle θ to the base line.

Figure 7:
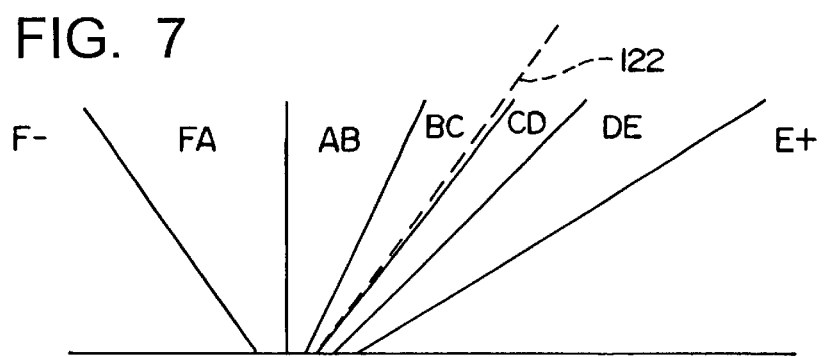
FIG. 7 is an angle scale having areas which designate a writer's emotional responsiveness based on the angle of the upstrokes, with the dotted line therein showing the average of the slant angles in the handwriting sample of FIG. 6.

The angles are summed and divided to determine the average slant angle for the sample. This average is then compared with a standard scale, or "gauge", to assess that aspect of the subjects personality which is associated with the slant angle of his writing. For example, FIG. 7 shows one example of a "slant gauge", which in this case has been developed by the International Graphoanalysis Society (IGAS), Chicago, Ill. As can be seen, this is divided into seven areas or zones—"F–", "FA", "AB", "BC", "CD", "DE" and "E+"—with each of these corresponding on a predetermined basis to some aspect or quality of the writer's personality; for example, the more extreme angles to the right of the gauge tend to indicate increasing emotional responsiveness, whereas more upright slant angles are an indication of a less emotional, more self-possessed personality. In addition, the slant which is indicated by dotted line 122 lies within the zone "BC", which is an indication that the writer, while tending to respond somewhat emotionally to influences, still tends to be mostly stable and level-headed in his personality.

The flow chart in FIG. 1 illustrates the basic steps which are undertaken in the measurement and analysis of a handwriting sample in accordance with one embodiment of the present invention as applied to handwriting analysis. As described above, the first step in the process is to scan the handwriting sample and to create a digital bit-map file.

The initial step in the analysis phase is to read in the digital bit-map file which has been transmitted from the scanner system, and to display this on the computer monitor for marking with the cursor (140). As a preliminary to conducting the measurements, the operator performs a dimensional calibration of the system (142); this can be done by placing a scale (e.g., a ruler) or drawing a line of known length (e.g., 1 centimeter, 1 inch, etc.) on the sample, then marking the ends of the line using a cursor and calibrating the display to the known distance; also, in some embodiments the subject may be asked to produce the handwriting sample on a form having a pre-printed calibration mark, which approach has the advantage of achieving an extremely high degree of accuracy.

Figure 8A:
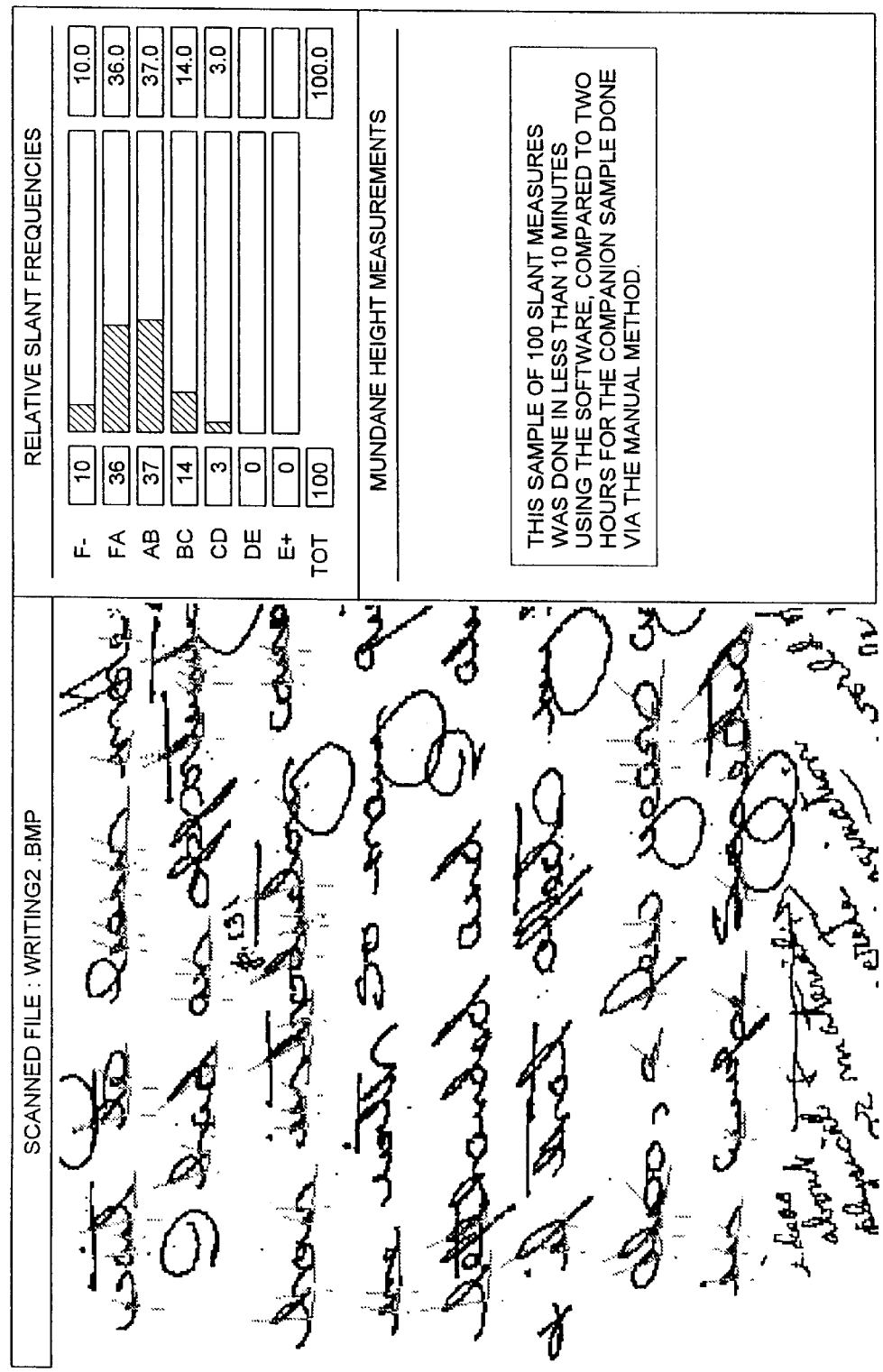

After dimensional calibration, the user takes the desired measurements from the sample, using a cursor on the monitor display as shown in FIG. 8. To mark each measurement point, the operator moves the cursor across the image which is created from the bit-map, and uses this to mark selected points on the various parts of the strokes or letters in the specimen.

To obtain the angle measurement (block 144 in FIG. 1), the operator first establishes the relevant base line; since the letters themselves may be written in a slant across the page, the slant measurement must be taken relative to the base line and not the page. To obtain slant measurements for analysis by the IGAS system, the base line is preferably established for each stroke or letter, by pinning the point where each stroke begins to rise from its lowest point.

In a preferred embodiment of the invention, the operator is not required to move the cursor to the exact lowest point of each stroke, but instead simply "clicks" a short distance beneath this, and the software generates a "feeler" cursor which moves upwardly from this location to the point where the writing (i.e., the bottom of the upstroke) first appears on the page. To carry out the "feeler" cursor function, the software reads the "color" of the bit-map, and assumes that the paper is white and the writing is black: If (moving upwardly) the first pixel is found to be white, the software moves the cursor upwardly to the next pixel, and if this is again found to be white, it goes up another one, until finally a "black" pixel is found which identifies the lowest point of the stroke. When this point is reached, the software applies a marker (e.g., see the "plus" marks in FIG. 8), preferably in a bright color so that the operator is able to clearly see and verify the starting point from which the base line is to be drawn.

After the starting point has been identified, the software generates a line ( commonly referred to as a "rubber band") which connects the first marker with the moving cursor. The operator then positions the cursor beneath the bottom of the adjacent downstroke (i.e., the point where the downstroke stops descending), or beneath next upstroke, and again releases the feeler cursor so that this extends upwardly and generates the next marker. When this has been done, the angle at which the "rubber band" extends between the two markers establishes the base line for that stroke or letter.

To measure the slant angle, the program next generates a second "rubber band" which extends from the first marker (i.e., the marker at the beginning of the upstroke), and the operator uses the moving cursor to pull the line upwardly until it crosses the top of the stroke. Identifying the end of the stroke, i.e., the point at which the writer began his "lift-off" in preparation for making the next stroke, can be done visually by the operator, while in other embodiments this determination may be performed by the system itself by determining the point where the density of the stroke begins to taper off, in the manner which will be described below. In those embodiments which rely on visual identification of the end of the stroke, the size of the image may be enlarged (magnified) on the monitor to make this step easier for the operator.

Once the angle measuring "rubber band" has been brought to the top of the stroke, the cursor is again released so as to mark this point. The system then determines the slant of the stroke by calculating the included angle between the base line and the line from the first marker to the upper end of the stroke. The angle calculation is performed using standard geometric equations.

As each slant angle is calculated, this is added to the tally of strokes falling in each of the categories (block 146 in FIG. 1), e.g., the seven categories of the "slant gage" shown in FIG. 7. For example, if the calculated slant angle of a particular stroke is 600, then this is added to 22 the tally of strokes falling in the "BC" category. Then, as the measurement of the sample progresses, the number of strokes in each category and their relative frequencies is tabulated for assessment by the operator; for example, in FIG. 8, the number of strokes out of 100 falling into each of the categories FÄ, FA, AB, BC, CD, DE and E+ are 10, 36, 37, 14, 3, 0 and 0, respectively. The relative frequencies of the slant angles (which are principally an indicator of the writer's emotional responsiveness) are combined with other measured indicators to construct a profile of the individual's personality traits, as will be described in greater detail below.

As is shown at block 148 in FIG. 1, the next major step is to obtain the height measurements of the various areas of the handwriting, e.g., the relative heights of the mundane area, abstract area, and material area. Although for purposes of discussion this measurement is described as being carried out subsequent to the slant angle measurement step, the system of the present invention is preferably configured so that both measurements are carried out simultaneously, thus greatly enhancing the speed and efficiency of the process.

Accordingly, as the operator pulls the "rubber band" line to the top of each stroke using the cursor and then releases the feeler cursor so that this moves down to mark the top of the stroke, the "rubber band" not only determines the slant angle of the stroke, but also the height of the top of the stroke above the base line. In making the height measurement, however, the distance is determined vertically (i.e., perpendicularly) from the base line, rather than measuring along the slanting line of the "rubber band".

As was noted above, the tops of the strokes which form the "ascender letters" define the abstract area, while the heights of the strokes forming the lower letters (e.g., "a", "e") and the descending (e.g., "g", "p", "y") below the base line determine the mundane and material areas. Differentiation between the strokes measured for each area ( e.g., differentiation between the ascender letters and the lower letters) may be done by the user (as by clicking on only certain categories of letters or by identifying the different categories using the mouse or keyboard, for example), or in some embodiments the differentiation may be performed automatically by the system after the first several measurements have established the approximate limits of the ascender, lower, and descender letters for the particular sample of handwriting which is being examined.

As with the slant angle measurements, the height measurements are tallied (block 150 in FIG. 1) for use by the graphoanalyst. For example, the heights can be tallied in categories according to their absolute dimensions (e.g., a separate category for each $1/16$ inch), or by the proportional relationship between the heights of the different areas. In particular, the ratio between the height of the mundane area and the top of the ascenders (e.g., 2×the height, 2"×, 3×, and so on) is an indicator of interest to the graphoanalyst.

The depth measurement phase of the process, as indicated at block 152 in FIG. 1, differs from the steps described above, in that what is being measured is not a geometric or dimensional aspect of each stroke (e.g., the height or slant angle), but is instead a measure of its intensity, i.e., how hard the writer was pressing against the paper when making that stroke. This factor in turn is used to "weight" the character trait which is associated with the stroke; for example, if a particular stroke indicates a degree of hostility on the part of the writer, then a darker, deeper stroke is an indicator of a more intense degree of hostility.

While graphoanalysts have long tried to guess at the pressure which was used to make a stroke so as to use this as a measure of intensity, in the past this has always been done on an "eyeball" basis, resulting in extreme inconsistency of results. The present invention eliminates such inaccuracies. In making the depth measurement, a cursor is used which is similar to that described above, but in this case the "rubber band" is manipulated to obtain a "slice" across some part of the pen or pencil line which forms the stroke. Using a standard grey scale (e.g., a 256-level grey scale), the system measures the darkness of each pixel along the track across the stroke, and compiles a list of the measurements as the darkness increases generally towards the center of the stroke and then lightens again towards the opposite edge. The darkness (absolute or relative) of the pixels and/or the width/length of the darkest portion of the stroke are then compared with a predetermined standard (which preferably takes into account the type of pen/pencil and paper used in the sample), or with darkness measurements taken at other areas or strokes within the sample itself, to provide a quantifiable measure of the intensity of the stroke in question.

As is shown in FIG. 5, the levels of darkness measured along each cut may be translated to form a two-dimensional representation of the "depth" of the stroke. In this figure (and in the corresponding monitor display), the horizontal axis represents the linear distance across the cut, while the vertical axis represents the darkness which is measured at each point along the horizontal axis, relative to a base line 160 which represents the color of the paper (assumed to be white).

Accordingly, the two dimensional image forms a valley "v" which extends over the width "w" of the stroke. For example, for a first pixel measurement "a" which is taken relatively near the edge of the stroke, where the pen/pencil line is somewhat lighter, the corresponding point "d" on the valley curve is a comparatively short distance "d1" below the base line, whereas for a second pixel measurement "c" which taken nearer to the center of the stroke where the line is much darker, the corresponding point "d" is a relatively greater distance "d2" below the base line, and so on across the entire width "w" of the stroke. The maximum depth "D" along the curve "v" therefore represents the point of maximum darkness/intensity along the slice through the stroke.

As can be seen at block 154 in FIG. 1, the depth measurements are tallied in a manner similar to the angle and height measurements described above for use by the graphoanalyst by comparison with predetermined standards. Moreover, the depth measurements for a series of slices taken more-or-less continuously over part or all of the length of the stroke may be compiled to form a three-dimensional display of the depth of the stroke (block 56 in FIG. 3), as which will be described in greater detail below.

Referring to blocks 146, 150, and 154 in FIG. 1, the system thus assembles a complete tally of the angles, heights, and depths which have been measured from the sample. As was noted above, the graphoanalyst can compare these results with a set of predetermined standards so as to prepare a graphoanalyst trait inventory, such as that which is shown in FIG. 5, this being within the skill of a graphoanalyst having ordinary skill in the relevant art. The trait inventory can in turn be summarized in the form of the trait profile for the individual (see FIG. 10), which can then be overlaid on or otherwise displayed in comparison with a standardized or idealized trait profile. For example, the bar graph 158 in FIG. 10 compares the trait profile which has been determined for the subject individual against an idealized trait profile a "business consultant", this latter having been established by previously analyzing handwriting samples produced by persons who have proven successful in this type of position. Moreover, in some embodiments of the present invention, these steps may be performed by the system itself, with the standards and/or idealized trait profiles having been entered into the computer, so that this produces the trait inventory/profile without requiring intervention of the human operator.

It is to be recognized that various alterations, modifications, and/or additions may be introduced into the constructions and arrangements of parts described above without departing from the spirit or ambit of the present invention.

What is claimed is:

1. A method of enhancing a visually perceptible source image for analysis, comprising the steps of:
   digitizing the source image to obtain a first set of pixel data comprising source image location data and source image intensity data, where
   the source image location data corresponds to spatial features of the source image, and
   the source image intensity data corresponds to optical features of the source image;
   generating a three-dimensional model of the pixel data with the source image location data represented in first and second axes and the source image intensity data represented in a third axis, where the three-dimensional model defines the location of a plurality of points in a space;
   generating a second set of pixel data comprising enhanced image location data and enhanced image intensity data, where the enhanced image location data is generated based on the three-dimensional model and at least a portion of the plurality of points of the second set of pixel data is generated from a first viewpoint in the space;
   displaying at least a portion of the second set of pixel data as a first visually perceptible enhanced image;
   generating a third set of pixel data comprising enhanced image location data and enhanced image intensity data, where the enhanced image location data is generated based on the three-dimensional model and at least a portion of the plurality of points of the third set of pixel data is generated from a second viewpoint in the space, where the second viewpoint is different from the first viewpoint; and
   displaying at least a portion of the third set of pixel data as a second visually perceptible enhanced image.

2. A method as recited in claim 1, further comprising the step of mathematically analyzing the three-dimensional model.

3. A method as recited in claim 1, further comprising the step of statically analyzing the three-dimensional model.

4. A method as recited in claim 1, in which:
   the source image represents an object from a source viewpoint; and
   the first and second enhanced images represent a modified view of the object from the first and second viewpoints, where the first and second viewpoints are different.

5. A method as recited in claim 1, in which the three-dimensional model defines the location of a plurality of points in a space, where the step of generating the second set of pixel data further comprises the step of representing at least a portion of the plurality of points using perspective.

6. A method as recited in claim 1, in which the three-dimensional model defines the location of a plurality of points in a space, in which the step of generating the second set of pixel data further comprises the steps of:

selecting a cross-sectional plane; and displaying the enhanced image to represent at least a portion of the plurality of points that intersect the cross-sectional plane.

7. A method as recited in claim 1, in which the first, second, and the third axes each define first, second, and third reference planes that intersect at an origin point.

8. A method as recited in claim, in which:

the intensity data represents levels of luminosity;

a difference between certain levels of luminosity is not visually perceptible in the source image; and the enhanced image is displayed to allow levels of luminosity that are not visually perceptible in the source image to be visually perceived.

9. A method as recited in claim 1, in which:

the intensity data represents levels of gray scale; and a difference between certain levels of gray scale is not visually perceptible in the source image; and the enhanced image is displayed to allow levels of gray scale that are not visually perceptible in the source image to be visually perceived.

10. A method as recited in claim 1, in which the source image intensity data has no relation to spatial features of the source image.

11. A method as recited in claim 1, in which the third axis of the three-dimensional model determines at least a portion of spatial features of the enhanced images.

12. A method as recited in claim 10, in which the third axis of the three-dimensional model determines spatial features of the enhanced images.

13. A method as recited in claim 1, in which the three-dimensional model defines the location of a plurality of points in a space, the method further comprising the step of:

selecting a plurality of cross-sectional planes; and displaying the enhanced image to represent at least a portion of the plurality of points that intersect the cross-sectional plane.

14. A method as recited in claim 1, in which the enhanced image intensity data of the second and third sets of pixel data is unrelated to the source image intensity data.

* * * * *

UNITED STATES PATENT AND TRADEMARK OFFICE
CERTIFICATE OF CORRECTION

PATENT NO. : 6,654,490 B1
DATED : November 25, 2003
INVENTOR(S) : Patrick B. Love It is certified that error appears in the above-identified patent and that said Letters Patent is hereby corrected as shown below:

Column 16,
Line 61, "statically" should be -- statistically --

Column 17,
Line 15, please delete the word "the" to read -- second, and third axes --
Line 17, please add -- 1 -- after the word "claim"

Column 18,
Line 17, "step" should be -- steps --

Signed and Sealed this

Eighth Day of June, 2004

JON W. DUDAS
*Acting Director of the United States Patent and Trademark Office*